(12) United States Patent
Wojciechowski et al.

(10) Patent No.: US 7,112,142 B2
(45) Date of Patent: Sep. 26, 2006

(54) METHOD OF COLD FORMING A SELF-ATTACHING FEMALE FASTENER ELEMENT

(75) Inventors: Stanley E. Wojciechowski, Lancaster, CA (US); John M. Parker, Ann Arbor, MI (US)

(73) Assignee: Whitesell International Corporation, Taylor, MI (US)

( * ) Notice: Subject to any disclaimer, the term of this patent is extended or adjusted under 35 U.S.C. 154(b) by 156 days.

(21) Appl. No.: 10/499,781

(22) PCT Filed: Dec. 16, 2002

(86) PCT No.: PCT/US02/40279

§ 371 (c)(1),
(2), (4) Date: Oct. 26, 2004

(87) PCT Pub. No.: WO03/062652

PCT Pub. Date: Jul. 31, 2003

(65) Prior Publication Data

US 2005/0103086 A1  May 19, 2005

(51) Int. Cl.
*B21D 53/24* (2006.01)
*B21H 3/08* (2006.01)
*B21K 1/64* (2006.01)

(52) U.S. Cl. ............... 470/25; 470/19; 470/21
(58) Field of Classification Search ........... 470/18, 470/19, 20, 21, 25, 26, 87, 89, 91, 197
See application file for complete search history.

(56) References Cited

U.S. PATENT DOCUMENTS

| | | | |
|---|---|---|---|
| 1,112,525 A | 10/1914 | Darling | |
| 1,919,552 A | 7/1933 | Hasselquist | |
| 2,539,899 A * | 1/1951 | Delaney | 470/19 |
| 3,213,914 A | 10/1965 | Baumle et al. | |
| 3,253,631 A | 5/1966 | Reusser | |
| 3,282,315 A | 11/1966 | Zahodiakin | |
| 3,469,613 A | 9/1969 | Steward | |
| 3,648,747 A | 3/1972 | Steward | |
| 3,736,969 A | 6/1973 | Warn et al. | |
| 3,793,658 A * | 2/1974 | Ladouceur | 470/21 |
| 3,810,291 A | 5/1974 | Ladouceur | |
| 3,878,599 A | 4/1975 | Ladouceur et al. | |
| 3,910,331 A | 10/1975 | Randall | |
| 4,389,766 A | 6/1983 | Capuano | |
| 4,432,681 A | 2/1984 | Capuano | |
| 4,470,736 A | 9/1984 | Tasseron | |
| 4,543,023 A | 9/1985 | Capuano | |
| 4,627,776 A | 12/1986 | Pamer et al. | |

(Continued)

FOREIGN PATENT DOCUMENTS

EP   0 561 715 A1   3/1993

(Continued)

OTHER PUBLICATIONS

PCT/US02/40279 International Search Report.

*Primary Examiner*—Ed Tolan
(74) *Attorney, Agent, or Firm*—Howard & Howard Attnys.

(57) ABSTRACT

A method of cold forming a self-attaching female fastener (20) which includes deforming a fastener blank (120) having an annular pilot, (122) an annular flange (128) surrounding the pilot and a groove (132) in the flange having cylindrical walls and annular protrusions (152, 154) on the flange and pilot, then deforming the protrusions toward each other to form an annular re-entrant groove (32) having relatively inclined arcuate walls.

18 Claims, 2 Drawing Sheets

U.S. PATENT DOCUMENTS

| | | | |
|---|---|---|---|
| 4,637,766 A | 1/1987 | Milliser | |
| 4,708,556 A | 11/1987 | Pamer et al. | |
| 4,893,976 A | 1/1990 | Milliser et al. | |
| 5,251,370 A | 10/1993 | Muller et al. | |
| 5,302,066 A | 4/1994 | Bieschke et al. | |
| 5,335,411 A | 8/1994 | Muller et al. | |
| 5,340,251 A | 8/1994 | Takahashi et al. | |
| 5,423,645 A | 6/1995 | Muller et al. | |
| 5,509,766 A | 4/1996 | Leuschner | |
| 5,531,552 A | 7/1996 | Takahashi et al. | |
| 5,549,430 A | 8/1996 | Takahashi et al. | |
| 5,613,815 A | 3/1997 | Muller | |
| 5,782,594 A | 7/1998 | Muller | |
| 5,882,159 A | 3/1999 | Muller | |
| 6,004,087 A | 12/1999 | Muller | |
| 6,081,994 A | 7/2000 | Muller | |
| 6,125,524 A | 10/2000 | Mueller | |
| 6,220,804 B1 | 4/2001 | Pamer et al. | |
| 6,257,814 B1 | 7/2001 | Muller | |
| 6,276,040 B1 | 8/2001 | Muller | |
| D448,659 S | 10/2001 | Pamer et al. | |
| 6,318,940 B1 | 11/2001 | Mitts | |
| D457,054 S | 5/2002 | Pamer et al. | |
| 6,409,444 B1 | 6/2002 | Pamer et al. | |
| 6,543,979 B1 | 4/2003 | Iwatsuki | |
| 2001/0010789 A1 | 8/2001 | Pamer et al. | |
| 2002/0159858 A1 | 10/2002 | Ikami et al. | |
| 2002/0172573 A1 | 11/2002 | Pamer et al. | |
| 2002/0182032 A1 | 12/2002 | Anderson et al. | |
| 2003/0039530 A1 | 2/2003 | Ross et al. | |

FOREIGN PATENT DOCUMENTS

| | | |
|---|---|---|
| EP | 0 864 766 A | 9/1998 |

* cited by examiner

METHOD OF COLD FORMING A SELF-ATTACHING FEMALE FASTENER ELEMENT

This application is a 35 USC 371 of PCT/US02/40279 filed Dec. 16, 2002.

FIELD OF THE INVENTION

This invention relates to a method of cold forming a self-attaching female fastener element having a central projecting pilot portion, an annular flange surrounding the pilot portion and a re-entrant groove in the end face of the flange portion.

BACKGROUND OF THE INVENTION

Self-attaching female fastener elements including nuts having a re-entrant groove are presently formed by rolling a continuous metal strip having the cross-section of the female fastener elements including a continuous projecting pilot portion and flange portions on opposed sides of the pilot portion as disclosed, for example, in U.S. Pat. Nos. 3,187,796 and 3,648,747 assigned to the assignee of the predecessor in interest of the assignee of the present application. The rolled strip is then pierced to form a cylindrical bore and the rolled strip is then severed or chopped, forming discreet female fastener elements or nuts each having a rectangular pilot portion and rectangular flange portions on opposed sides of the pilot portion. As disclosed in the above-referenced U.S. patents, grooves are rolled into either the side portions of the pilot portion or the flange portions on opposed sides of the pilot portion for attachment of the self-attaching female fastener element or nut to a panel. Self-attaching female fastener elements may be utilized to pierce an opening in the panel, commonly referred to as pierce nuts, wherein the rectangular pilot portion pierces the panel and the panel metal adjacent the pierce panel opening is then deformed into the grooves by a die member or die button. Alternatively, the self-attaching female fastener elements may be installed in a pre-pierced opening in the panel. In a typical application, the self-attaching female fastener elements are received in an installation head in an upper die shoe or platen of a die press having a reciprocating plunger and the panel is received on a die button in the lower die shoe or platen, such that a self-attaching female fastener element is installed in the panel with each stroke of the die press.

In one preferred embodiment as disclosed in the above-referenced U.S. Pat. No. 3,648,747, re-entrant grooves are provided in the flange portions on opposed sides of the pilot portion providing improved push-off strength of the self-attaching female fastener element following installation in a panel. As used herein, the term "re-entrant groove" refers to a groove having an opening at the end face of the flange portion having a width less than the bottom wall of the groove, wherein the die button includes projecting lips which deform the panel metal adjacent the panel opening against the bottom wall of the groove, deforming the panel metal beneath the restricted opening to the groove and providing improved retention. In a preferred embodiment, the inner and outer groove walls are inclined toward each other forming a dovetail-shaped groove providing further improved retention of the female fastener element in a panel. At present, however, dovetail-shaped grooves can only be formed by rolling, as described in the above-referenced U.S. patents, which also requires that the pilot and flange portions be rectangular using present technology. However, the rectangular pilot portion may form stress risers at the corners of the rectangular opening which receives the pilot portion of the self-attaching female fastener element as described above. Further, there are many applications which require a self-attaching female fastener element which can presently be formed only by cold forming, including cold heading and progressive dies, such as self-attaching female fastener elements having an annular or cylindrical pilot portion and an annular flange surrounding the pilot portion.

The cold forming method of this invention may be utilized to form self-attaching fasteners having an annular or cylindrical projecting central pilot portion, an annular flange portion surrounding the pilot portion and a re-entrant groove in the flange portion which is one of the objects of this invention. The self-attaching fastener formed by the method of this invention may be utilized either as a pierce nut or clinch nut as described above.

SUMMARY OF THE INVENTION

The method of cold forming a self-attaching female fastener of the is invention includes cold forming a female fastener element blank, including an annular projecting central pilot portion having an end face, a bore through the pilot portion through the end face, an annular flange portion surrounding the pilot portion having an end face preferably spaced below the end face of the pilot portion and an annular groove in the end face of the flange portion surrounding the pilot portion. In the female fastener element blank formed by cold forming, the annular groove includes a bottom wall and generally parallel side walls including a cylindrical inner side wall adjacent the pilot portion extending generally perpendicular to the end face of the pilot portion and a cylindrical outer side wall extending generally perpendicular to the end face of the flange portion. The female fastener element blank formed by cold forming further includes a first integral annular projection extending from the end face of the pilot portion adjacent the inner side wall of the annular groove and a second integral annular projection extending from the end face of the flange portion adjacent the outer side wall of the annular groove. In the disclosed embodiment, the annular projections are rectangular in cross-section.

The above-described female fastener element blank can be formed by conventional cold forming techniques, including cold heading and progressive die techniques. In a preferred embodiment, the method of this invention includes cold forming a female fastener element blank having a cylindrical pilot portion, a cylindrical flange portion surrounding the pilot portion and the inner and outer side walls of the groove are generally cylindrical. However, in the most preferred method of this invention, the bottom wall of the groove includes annular arcuate or semi-circular surfaces adjacent the inner and outer side walls of the groove which assist in the later deformation of the annular protrusions providing good metal flow. In one disclosed embodiment, the groove bottom wall further includes circumferentially spaced arcuate protrusions, preferably having a planar end face which provide anti-rotation or torque resistance when the female fastener element is installed in a panel. The first annular protrusion extending from the pilot portion preferably has a cylindrical outer wall coaxially aligned with the cylindrical outer wall of the annular groove and the second annular protrusion preferably has a cylindrical inner wall coaxially aligned with the generally cylindrical outer wall of the annular groove.

The method of this invention then includes deforming the first annular protrusion radially outwardly to overlie the bottom wall of the groove, preferably forming a generally flat end face of the pilot portion and substantially simultaneously deforming the second annular projection radially inwardly to overlie the bottom wall of the groove, also preferably forming a planar end face on the annular flange portion. The method of this invention thereby forms an annular re-entrant groove in the flange portion including an opening at the end face of the flange portion including a width less than the bottom wall of the groove.

In one preferred embodiment of the method of this invention, the inner and outer groove walls are simultaneously deformed toward each other such that the inner and outer groove walls are relatively inclined toward each other forming a generally dovetail-shape. However, in a preferred embodiment of the method of this invention, the outer groove wall is deformed to form an arcuately radially inwardly inclined surface around the arcuate surface at the groove bottom wall and the inner groove wall is simultaneously deformed into an arcuate radially inwardly inclined surface around the arcuate surface at the groove bottom wall. In the disclosed method of this invention, the annular protrusions are deformed substantially simultaneously by a die member, but the method of this invention may also be performed in a progressive die. Although the method of cold forming a self-attaching female fastener element of this invention may be utilized to form various self-attaching female fastener element, the disclosed embodiment of the method of cold forming a self-attaching female fastener of this invention is an oil pan or transmission pan self-attaching female fastener element having a threaded bore and a projecting tubular portion opposite the pilot portion.

Other advantages and meritorious features of the method of cold forming a self-attaching female fastener element of this invention will be more fully understood from the following description of the preferred drawings, the appended claims and the drawings, a brief description of which follows.

DESCRIPTION OF THE PREFERRED EMBODIMENTS

Figure 1:
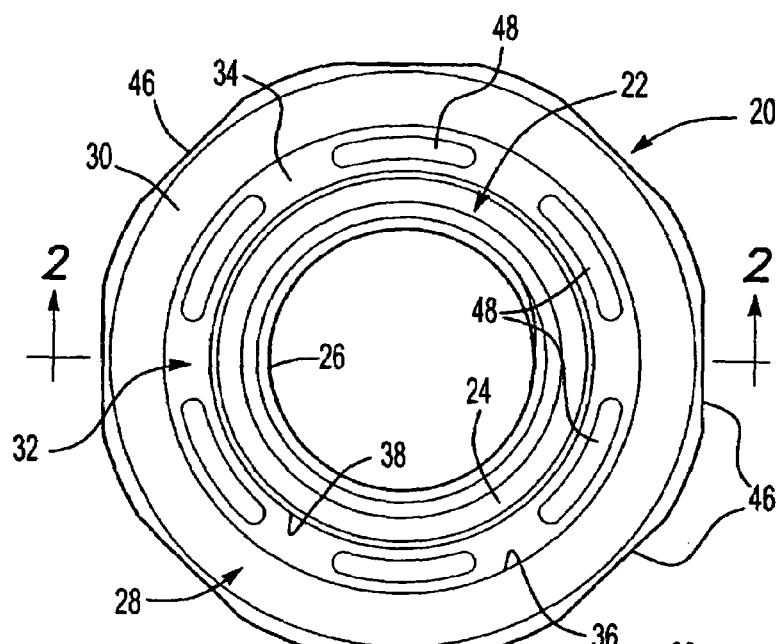
FIG. 1 is a top view of one embodiment of a female fastener element formed by the method of this invention.
Figure 2:
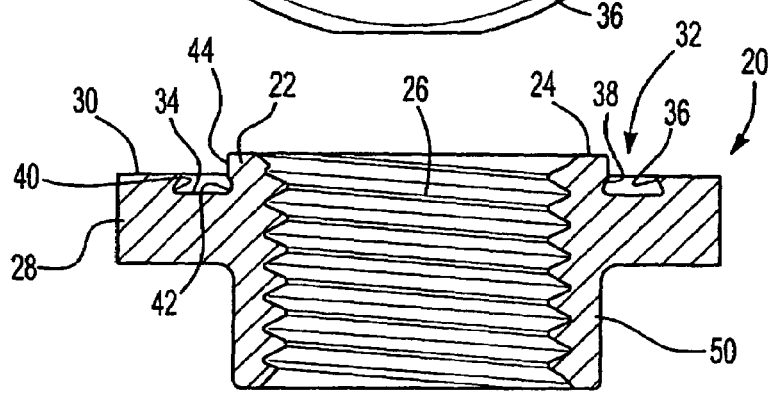
FIG. 2 is a side cross-sectional view of FIG. 1 in the direction of view arrows 2—2.

As set forth above, this invention relates to a method of cold forming a female fastener element having an annular reentrant groove as disclosed, for example, in FIGS. 1 and 2. The embodiment of the self-attaching female fastener element 20 shown in FIGS. 1 and 2 includes a central annular generally cylindrical pilot portion 22 having a planar annular end face 24, a bore 26 through the pilot portion 22 through the annular end face 24, an annular flange portion 28 surrounding the pilot portion 22 having a planar annular end face 30 and an annular re-entrant groove 32 surrounding the pilot portion. The annular re-entrant groove 32 includes a bottom wall 34, an annular inclined outer side wall 36 and an annular inclined inner side wall 38. As set forth above, the term "re-entrant groove" means that the entrance to the annular groove 32 at the end face 30 of the flange portion 20 has a radial width less than the width of the bottom wall 34 providing improved retention. In a preferred embodiment, the annular outer groove wall is inclined to provide a re-entrant groove. However, in a preferred embodiment, the re-entrant groove 32 further includes an inclined inner groove wall 38 which is inclined from the bottom wall 34 toward the inclined outer groove wall 36 and the pilot portion includes a generally cylindrical end portion 44.

Figure 5:
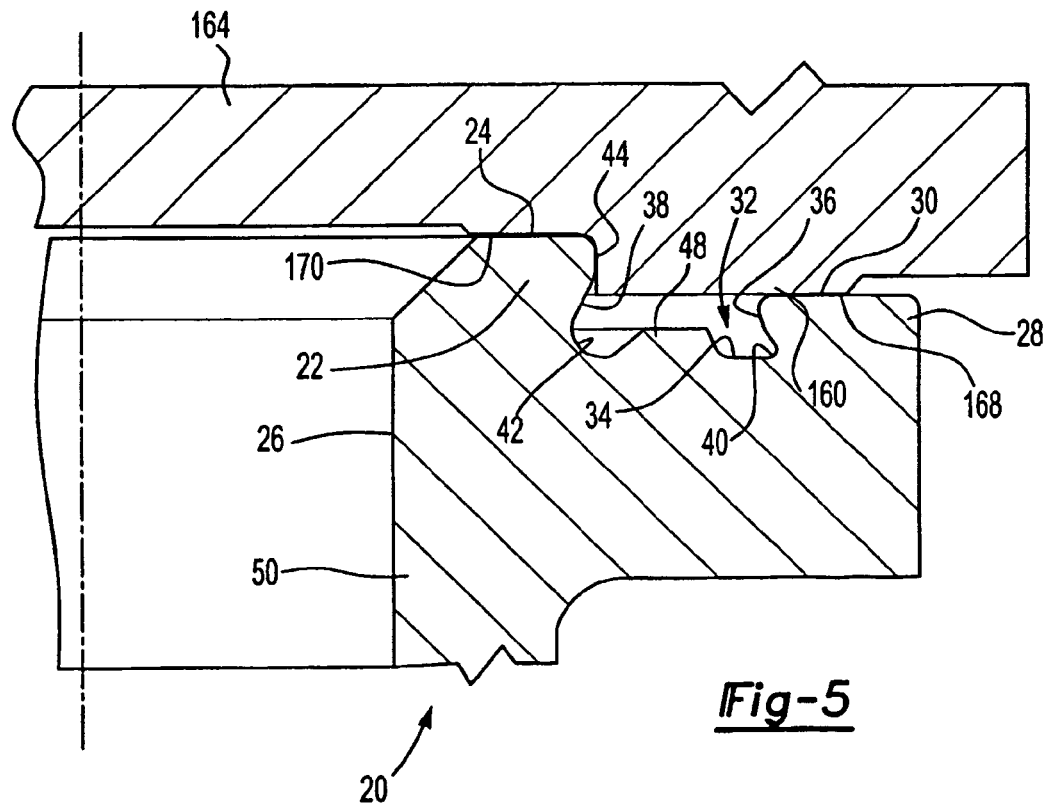
FIG. 5 is a partial cross-sectional view of FIG. 4 following formation of the female fastener element illustrated in FIGS. 1 and 2.

As best shown in FIG. 5, the outer and inner groove walls 36 and 38, respectively, are arcuately inclined toward each other and the annular groove 32 further includes an arcuate surface 40 adjacent the bottom wall 34 and an arcuate inner surface 42 which blend into the arcuately inclined inner and outer groove walls. As shown in FIG. 1, this embodiment of the self-attaching female fastener element 20 further includes polygonal flat surfaces 46 and the bottom wall 34 of the annular groove includes circumferentially spaced arcuate protrusions 48 which prevent or inhibit rotation of the female fastener element on a panel (not shown) following installation. This embodiment of the female fastener element 20 further includes an integral annular tubular portion 50 as shown in FIG. 2, which is concentric with the pilot portion 22. In the disclosed embodiment, the bore 26 is internally threaded or tapped. However, the bore 26 may also be cylindrical for receipt of a thread forming or thread rolling male fastener element.

Figure 3:
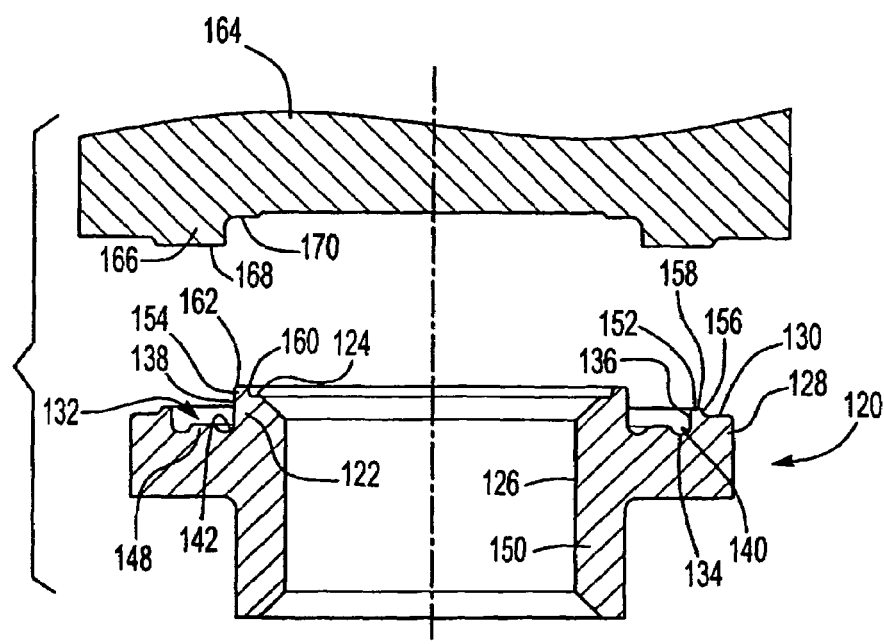
FIG. 3 is a side cross-sectional view of a female fastener element blank formed by the method of this invention and a die member utilized to form the female fastener element shown in FIGS. 1 and 2.
Figure 4:
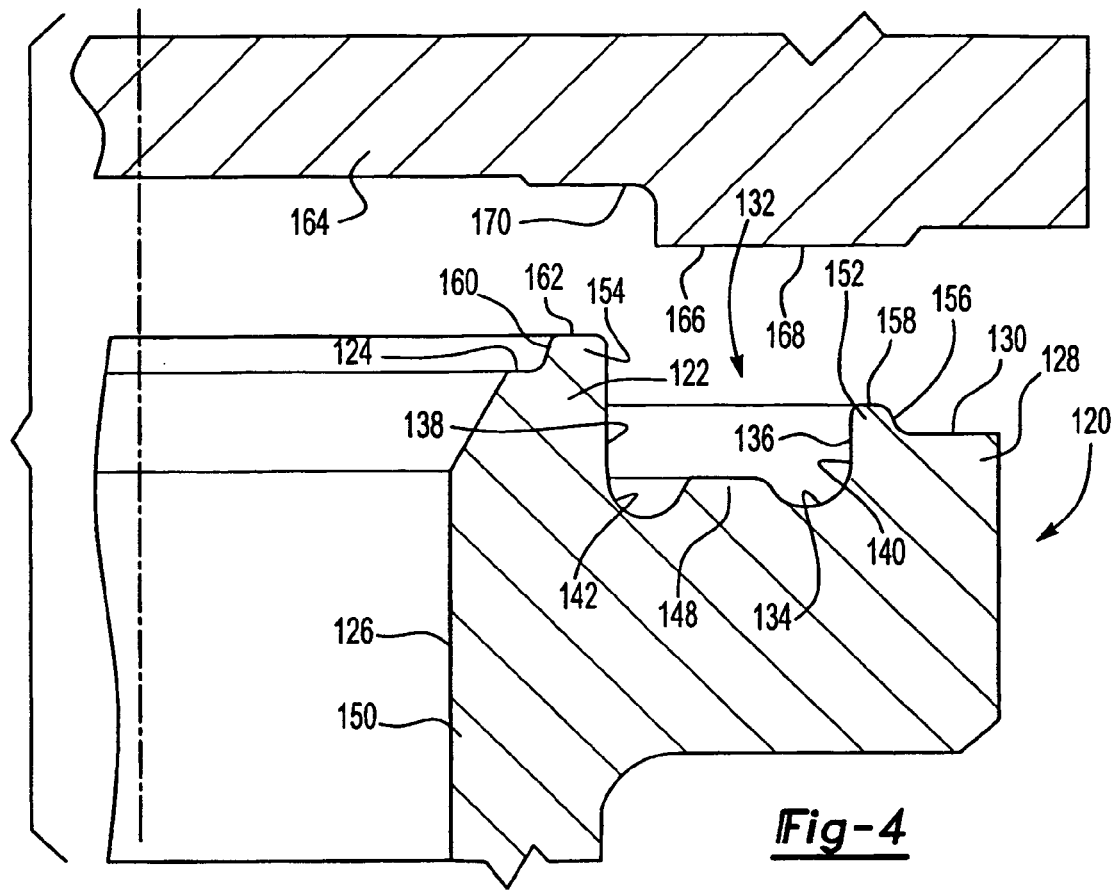
FIG. 4 is a partial enlarged side cross-sectional view of FIG. 3.

The self-attaching female fastener element 20 shown in FIGS. 1, 2 and 5 is formed from a female fastener element blank 120 shown in FIGS. 3 and 4. The female fastener element blank 120 includes a central annular pilot portion 122, having an annular end face 124, a bore 126 through the pilot portion through the end face 124, an annular flange portion 128 surrounding the pilot portion having an annular end face 130 and an annular groove 132 in the flange portion 128 having a bottom wall 134. However, in the female fastener element blank 120, the annular groove 132 includes a generally cylindrical outer side wall 136 and a generally cylindrical inner side wall 138 which also forms the outer side wall of the pilot portion 122. In the disclosed embodiment, the inner side wall 138 is inclined radially inwardly at about three degrees. In a preferred embodiment, the bottom wall 134 of the annular groove 132 includes an arcuate or semi-circular annular surface 140 which smoothly blends with the cylindrical outer side wall 136 and an arcuate or semi-circular annular inner surface 142 which smoothly blends with the generally cylindrical inner side wall 138 as best shown in FIG. 4.

The female fastener element blank 120 further includes an annular protrusion 152 integral with and projecting from the end face 130 of the flange portion 128 and an inner annular protrusion 154 integral with an projecting from the end face 124 of the pilot portion 122. In a preferred embodiment, the annular outer surface 156 of the outer annular protrusion 152 is inclined radially inwardly toward the pilot portion 122 or frustoconical having a generally planar end face 158 and the inner surface 160 of the protrusion 154 is inclined radially outwardly having a planar end face 162 as best shown in FIG. 4. The inner surface of the annular outer protrusion 152 is cylindrical and continuous with the cylindrical outer surface 136 of the annular groove 132 and the inner surface of the annular protrusion 154 is generally cylindrical and continuous with the inner generally cylindrical surface 138 of the annular groove 132.

As will be understood by those skilled in this art, the female fastener element blank 120 may be formed by conventional cold forming techniques including but not limited to progressive dies. Further, as set forth above, the prior art includes pierce nuts having linear re-entrant grooves on opposed sides of the pilot portion which are formed by progressive rolling techniques. However, the prior art does not include pierce nuts having an annular re-entrant groove formed by cold forming techniques, particularly a self-attaching female fastener element having a generally cylindrical pilot portion, an annular flange portion surrounding the pilot portion and a re-entrant groove in the planar end face of the flange portion. FIGS. 3 and 5 illustrate the final step in the method of this invention which forms the self-attaching female fastener element 20 illustrated in FIGS. 1 and 2. As shown in FIGS. 3 and 5, the annular protrusions 152 and 154 are deformed toward each other by a die member 164 including a projecting annular lip 166 having an annular planar end face 168 and the die member includes a planar surface 170 adjacent the annular lip 166 surrounded by the annular lip 166. As shown in FIGS. 3 and 4, the planar face 170 adjacent the projecting annular lip 166 of the die member 164 is aligned with the first or inner annular protrusion 154 of the female fastener element blank 120 and the planar end face 168 of the annular lip 166 is aligned with the second or outer annular protrusion 152 of the female fastener element blank 120. Upon closing of the die press (not shown), the planar surface 170 of the die member deforms the first annular protrusion 154 radially outwardly toward the flange portion 128 and the annular planar face 168 of the annular lip 166 deforms the second or outer annular protrusion 152 radially inwardly toward the pilot portion 122 forming a dovetail-shaped annular reentrant groove 32 shown in FIG. 5 and described above, wherein the annular end face 24 of the pilot portion 22 and the annular end face 30 of the flange portion are each substantially planar. As will be understood by those skilled in this art, the end face 24 of the pilot portion is preferably planar for self-piercing female fastener elements or pierce nuts and the annular end face 30 of the flange portion 28 is preferably planar to support a panel (not shown) following installation.

During deformation of the first and second annular protrusions 154 and 152, respectively, the generally cylindrical inner side wall 138 of the female fastener element blank 120 is deformed radially outwardly, forming an arcuately inclined inner groove wall 38 and the cylindrical outer groove wall 136 of the female fastener element blank 120 is deformed radially inwardly forming an arcuately inclined outer groove wall 36 as shown in FIG. 5. The arcuate inner and outer surfaces 142 and 140, respectively, provide a smooth transition from the bottom wall 134 to the inner and outer side walls promoting good medal flow during deformation of the side walls and avoid stress risers or cracking. As will be understood from the above description, the elements of the female fastener element blank 120 shown in FIGS. 3 and 4 have been numbered in the same sequence as the elements of the female fastener element 20 shown in FIGS. 1, 2 and 5 to reduce duplication of the description. The dovetail-shaped re-entrant groove 32 having arcuately inclined inner and outer groove walls 38 and 36, respectively, provide excellent retention and push-off strength of the female fastener element 20 following installation in a panel and the self-attaching female fastener element 20 may be utilized as a pierce nut to pierce an opening in a panel during installation. Further, the self-attaching female fastener 20 may be installed as a self-sealing nut as described in the application filed concurrently herewith.

As will be understood by those skilled in this art, various modifications may be made to the method of cold forming a self-attaching female fastener element of this invention within the purview of the appended claims. More specifically, the anti-rotation or torque resistant protrusions 48 in the bottom wall 34 of the annular groove are optional and may take various forms as will be understood by those skilled in this art. Where required, torque resistance may be provided by radial protrusions or grooves which extend from the inner side wall to the outer side wall, for example, or other anti-rotation means may be provided. Further, the integral annular tubular portion 50 in FIGS. 1, 2 and 5 and 150 in FIGS. 3 and 4 is provided only where the application requires additional support for a male threaded member, such as for an oil pan nut. Finally, as set forth above, the bore 26 may be threaded as shown in FIG. 2 or unthreaded for receipt of a thread forming or thread rolling male fastener element. Having described a preferred embodiment of the method of cold forming a self-attaching female fastener element of this invention, the invention is now claimed, as follows.

The invention claimed is:

1. A method of cold forming a self-attaching female fastener element, comprising the following steps:
   cold forming a female fastener element blank including an annular projecting central pilot portion having an end face, a bore through said pilot portion through said end face, an annular flange portion surrounding said pilot portion having an end face spaced below said end face of said pilot portion, an annular groove in said end face of said flange portion having a bottom wall and generally parallel side walls including an inner side wall adjacent said pilot portion extending generally perpendicular to said end face of said pilot portion and an outer side wall extending generally perpendicular to said end face of said flange portion, a first annular protrusion extending from said end face of said pilot portion adjacent said inner side wall of said annular groove and a second annular protrusion extending from said end face of said flange portion adjacent said outer side wall of said annular groove;
   deforming said first annular protrusion radially outwardly to overly said bottom wall of said groove; and
   substantially simultaneously deforming said second annular protrusion radially inwardly to overlie said bottom wall of said groove forming a generally planar end of said flange portion, thereby forming an annular re-entrant groove having a radial opening at said end face of said flange portion having a width less than a radial width of said bottom wall of said groove.

2. The method of cold forming a self-attaching female fastener element as defined in claim 1, wherein said method includes deforming said second annular protrusion radially inwardly and forming an inclined outer side wall of said groove.

3. The method of cold forming a self-attaching female fastener element as defined in claim 2, wherein said method includes deforming said second annular protrusion radially inwardly and forming an arcuately inclined wall extending from said bottom wall of said groove to adjacent said end face of said flange portion.

4. The method of cold forming a self-attaching female fastener element as defined in claim 1, wherein said method includes deforming said first annular protrusion radially outwardly and forming an outwardly inclined inner side wall.

5. The method of cold forming a self-attaching female fastener element as defined in claim 4, wherein said method includes deforming said first annular protrusion radially outwardly and forming an arcuately inclined outer side wall adjacent said bottom wall of said groove.

6. The method of cold forming a self-attaching female fastener element as defined in claim 5, wherein said method includes deforming an outer portion of said pilot portion adjacent said end face of said pilot portion generally perpendicular to said end face of said pilot portion.

7. The method of cold forming a self-attaching female fastener element as defined in claim 1, wherein said method includes cold forming said bottom wall of said groove to form arcuate portions adjacent said inner and outer side walls and circumferentially spaced protrusions between said arcuate portions.

8. The method of cold forming a self-attaching female fastener element as defined in claim 1, wherein said method includes deforming said first annular protrusion radially outwardly and forming a substantially planar end face of said pilot portion.

9. The method of cold forming a self-attaching female fastener element as defined in claim 1, wherein said method includes cold forming said female fastener element blank to include radial portions in said bottom wall adjacent said inner and outer side walls of said groove.

10. The method of cold forming a self-attaching female fastener element as defined in claim 9, wherein said method includes cold forming said bottom wall of said groove to form circumferentially spaced arcuate protrusions between said arcuate portions in said bottom wall of said groove.

11. A method of cold forming a self-attaching female fastener element, comprising the following steps:

cold forming a female fastener element blank including an annular cylindrical central pilot portion having an annular end face, a bore through said pilot portion through said end face, an annular flange portion surrounding said pilot portion having an end face spaced below said end face of said pilot portion, an annular groove in said end face of said flange portion surrounding said pilot portion having a bottom wall and generally parallel side walls including a generally cylindrical inner side wall defining an outer surface of said pilot portion extending generally perpendicular to said end face of said pilot portion and a generally cylindrical outer side wall extending generally perpendicular to said end face of said flange portion, a first annular protrusion having a cylindrical outer surface coaxially aligned with said inner side wall of said groove extending from said end face of said pilot portion and a second annular protrusion having a generally cylindrical inner surface coaxially aligned with said outer side wall of said groove; and deforming said first annular protrusion radially outwardly to overlie said bottom wall of said groove forming a generally flat end face of said pilot portion; and substantially simultaneously deforming said second annular protrusion radially inwardly to overlie said bottom wall of said groove, thereby forming a re-entrant groove including an opening at said end face of said pilot portion having a radial width less than a radial width of said bottom wall of said groove.

12. The method of cold forming a self-attaching female fastener element as defined in claim 11, wherein said method includes cold forming said female fastener element blank to form a bottom wall having arcuate surfaces adjacent said inner and outer side walls of said groove.

13. The method of cold forming a self-attaching female fastener element as defined in claim 12, wherein said method includes cold forming said bottom wall of said groove to include circumferentially spaced arcuate protrusions between said arcuate surfaces.

14. The method of cold forming a self-attaching female fastener element as defined in claim 11, wherein said method includes deforming said second annular protrusion radially inwardly forming an inclined outer side wall and a flat end face on said flange portion.

15. The method of cold forming a self-attaching female fastener element as defined in claim 14, wherein said method includes deforming said second annular protrusion radially inwardly and forming an arcuately inclined outer side wall of said groove extending from said bottom wall of said groove to adjacent said end face of said flange portion.

16. The method of cold forming a self-attaching female fastener element as defined in claim 11, wherein said method includes deforming said first annular protrusion radially outwardly and forming an outwardly inclined inner side wall of said groove.

17. The method of cold forming a self-attaching female fastener element as defined in claim 16, wherein said method includes deforming said first annular protrusion radially outwardly and forming an arcuately inclined wall adjacent said bottom wall of said groove.

18. The method of cold forming a self-attaching female fastener element as defined in claim 17, wherein said method includes deforming an outer portion of said pilot portion adjacent said end face of said pilot portion generally perpendicular to said end face of said pilot portion.

* * * * *

UNITED STATES PATENT AND TRADEMARK OFFICE
CERTIFICATE OF CORRECTION

PATENT NO. : 7,112,142 B2  Page 1 of 1
APPLICATION NO. : 10/499781
DATED : September 26, 2006
INVENTOR(S) : Stanley E. Wojciechowski and John M. Parker It is certified that error appears in the above-identified patent and that said Letters Patent is hereby corrected as shown below:

Column 6, line 47, please delete the word "overly" and insert -- overlie --.

Signed and Sealed this

Third Day of April, 2007

JON W. DUDAS
*Director of the United States Patent and Trademark Office*